United States Patent
Fong et al.

(10) Patent No.: US 8,347,780 B2
(45) Date of Patent: Jan. 8, 2013

(54) BEVERAGE AIR MANAGEMENT DISPENSING SYSTEM

(75) Inventors: John Fong, Irvine, CA (US); Peter Wright, Harlow (GB); Chris H. McDonald, Yorba Linda, CA (US); Gerard K. Caldwell, Corona, CA (US); David L. Phillips, Santa Ana, CA (US); David Allen, Santa Ana, CA (US); Thang Dang, Huntington Beach, CA (US); Daniel Gudalj, Orange, CA (US)

(73) Assignee: Xylem IP Holdings LLC, White Plains, NY (US)

( * ) Notice: Subject to any disclaimer, the term of this patent is extended or adjusted under 35 U.S.C. 154(b) by 948 days.

(21) Appl. No.: 12/272,385

(22) Filed: Nov. 17, 2008

(65) Prior Publication Data
US 2009/0283153 A1 Nov. 19, 2009

Related U.S. Application Data

(60) Provisional application No. 61/003,356, filed on Nov. 16, 2007, provisional application No. 61/013,765, filed on Dec. 14, 2007.

(51) Int. Cl.
*F16T 1/34* (2006.01)
(52) U.S. Cl. .................. 99/323.1; 137/177; 137/192
(58) Field of Classification Search ............. 137/177, 137/192; 99/323.1; 426/487, 477
See application file for complete search history.

(56) References Cited

U.S. PATENT DOCUMENTS

| | | | |
|---|---|---|---|
| 1,681,490 A | | 8/1928 | Lomax |
| 2,307,085 A | * | 1/1943 | Trexler ........................ 417/76 |
| 2,832,370 A | | 4/1958 | Hill |
| 3,152,604 A | | 10/1964 | Frye et al. |
| 3,643,688 A | | 2/1972 | Meinert |
| 3,807,607 A | * | 4/1974 | Kuckens ...................... 222/481 |
| 3,981,414 A | | 9/1976 | Gust et al. |
| 4,014,461 A | | 3/1977 | Harvill |
| 4,123,204 A | | 10/1978 | Scholle |
| 4,169,489 A | | 10/1979 | Inada et al. |
| 4,173,178 A | | 11/1979 | Wieland |
| 4,247,018 A | | 1/1981 | Credle |
| 4,259,360 A | | 3/1981 | Venetucci et al. |
| 4,354,806 A | | 10/1982 | McMillin et al. |
| 4,487,333 A | | 12/1984 | Pounder et al. |

(Continued)

FOREIGN PATENT DOCUMENTS

EP  0235437  9/1987

(Continued)

OTHER PUBLICATIONS

3 Pages International Search Report mailed Apr. 29, 2009, International Application PCT/US2008/083777—International Filing Date Nov. 17, 2008.

*Primary Examiner* — Anthony Weier

(57) ABSTRACT

The present invention provides a method and apparatus for separating air from a fluid, such as syrup, as the fluid enters a first chamber of a system; passing the fluid from the first chamber to a second chamber via a first device; passing the air from the first chamber to the second chamber via a second device so as to reintroduce the air back into the fluid and form a new fluid mixture having more uniform air bubbles; and discharging the new fluid out of the system.

8 Claims, 14 Drawing Sheets

U.S. PATENT DOCUMENTS

| | | | |
|---|---|---|---|
| 4,544,328 A | 10/1985 | Credle, Jr. | |
| 4,674,526 A | 6/1987 | Athanassiu | |
| 4,957,220 A | 9/1990 | Du | |
| 5,021,219 A | 6/1991 | Rudick et al. | |
| 5,024,952 A * | 6/1991 | Alsop | 436/177 |
| 5,033,646 A | 7/1991 | McCann et al. | |
| 5,071,039 A | 12/1991 | Anglehart | |
| 5,082,143 A | 1/1992 | Schramm, Jr. | |
| 5,125,541 A | 6/1992 | Anglehart | |
| 5,341,957 A | 8/1994 | Sizemore | |
| 5,379,795 A | 1/1995 | Hartley et al. | |
| 5,445,186 A | 8/1995 | Richter et al. | |
| 5,450,882 A | 9/1995 | Cragun | |
| 5,457,251 A * | 10/1995 | Yamashita et al. | 585/269 |
| 5,470,209 A | 11/1995 | Hartley et al. | |
| 5,476,193 A | 12/1995 | Haynes | |
| 5,558,506 A | 9/1996 | Simmons et al. | |
| 5,664,940 A | 9/1997 | Du | |
| 5,667,105 A | 9/1997 | Hartley et al. | |
| 5,833,439 A | 11/1998 | Du | |
| 6,267,268 B1 | 7/2001 | Quartarone et al. | |
| 6,685,443 B2 | 2/2004 | Simmons et al. | |
| 6,874,997 B2 | 4/2005 | Watanabe et al. | |
| 2002/0145008 A1 | 10/2002 | Jones et al. | |
| 2004/0206157 A1 | 10/2004 | Chen et al. | |
| 2004/0211322 A1 | 10/2004 | Halliday | |
| 2005/0175750 A1 | 8/2005 | Sanders | |
| 2006/0254642 A1 | 11/2006 | Kshirsagar et al. | |
| 2011/0305807 A1 | 12/2011 | Koeling et al. | |

FOREIGN PATENT DOCUMENTS

| | | |
|---|---|---|
| EP | 0636407 | 2/1995 |
| WO | 2008005564 | 10/2008 |

* cited by examiner

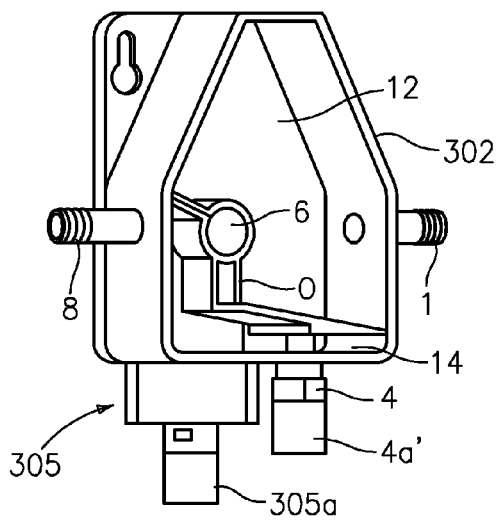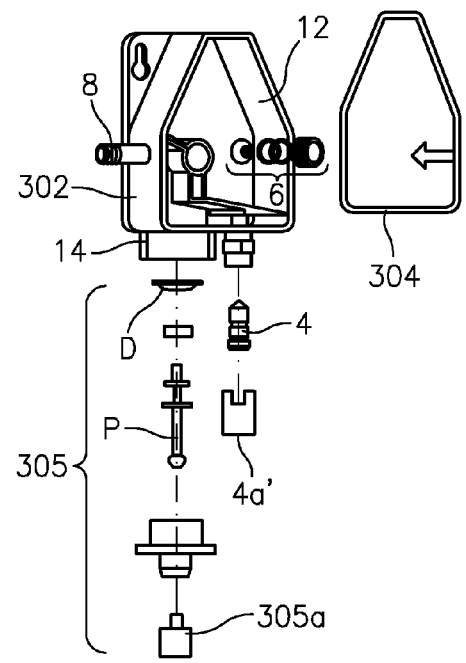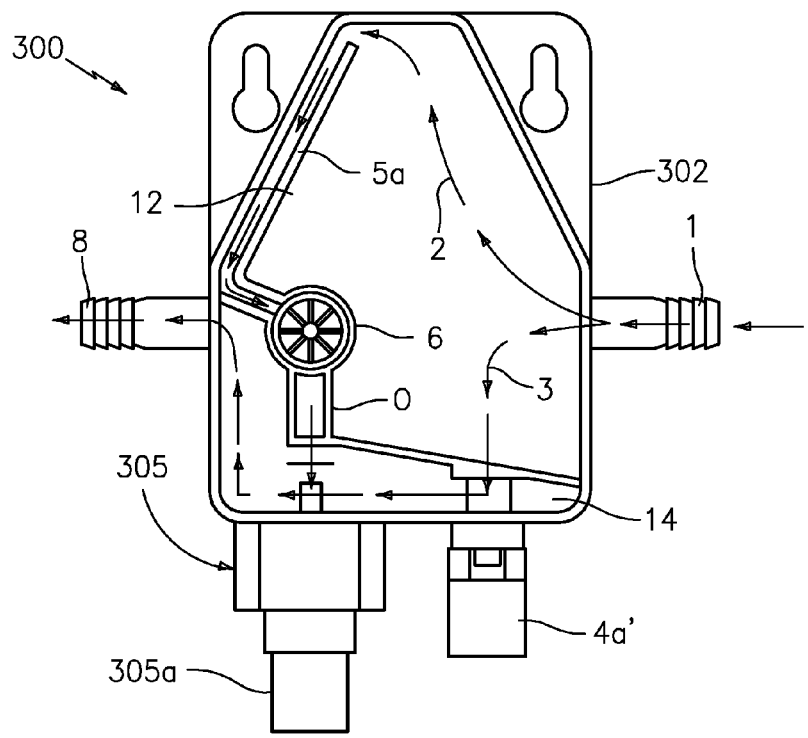
FIG. 13c
FIG. 13b
FIG. 13a

BEVERAGE AIR MANAGEMENT DISPENSING SYSTEM

CROSS-REFERENCE TO RELATED APPLICATIONS

This application claims benefit to provisional patent application Ser. No. 61/003,356, filed 16 Nov. 2007 and provisional patent application Ser. No. 61/013,765, filed 14 Dec. 2007, which are both incorporated by reference in their entirety.

BACKGROUND OF THE INVENTION

1. Field of the Invention

The present invention relates to a method and apparatus for dispensing a fluid; and more particularly relates to a managing the amount of air being dispensed with such a fluid, including syrup for making beverages like soda.

2. Brief Description of Related Art

In known dispensing system, a bag of syrup is attached to the dispensing system for providing the syrup into a drink. The syrup may include that needed to dispense soda or fruit drinks, e.g., at a fast food restaurant. Air bubbles entrained in the bag of syrup or pressure lines can cause problems in providing drinks having uniform consistency in taste. For example, the taste of one drink having syrup having a large air bubble dispensed therein can be very different than the taste of another drink having syrup having little or no air bubbles dispensed therein. The discerning customer can easily distinguish between the drinks having the different tastes.

In the prior art, there are many different ways to try to solve this problem by burping air from pressure lines, on the vacuum side of the system, to atmosphere through either float actuated valves or other means. However, there are problems with these techniques including the syrup clogging the air vent valve which then make the unit useless. The known units can also make a mess as the syrup leaks out. Contact with atmosphere also allows bacteria and mold to build and grow. These systems also require maintenance more often due to the tendencies listed above.

In view of this, there is a need in the industry to solve this problem.

SUMMARY OF THE INVENTION

The present invention provides a new and unique method and apparatus for separating air from a fluid, such as syrup, as the fluid enters a first chamber of a system; passing the fluid from the first chamber to a second chamber via a first device; passing the air from the first chamber to the second chamber via a second device so as to reintroduce the air back into the fluid and form a new fluid mixture having more uniform air bubbles; and discharging the new fluid mixture out of the system via an outlet port.

The second device may include an air channel having a check valve arranged between the first chamber and the second chamber configured to prevent the fluid from backing up into the air channel.

The first device may include an air/syrup vacuum ratio adjustable valve arranged between the first chamber and the second chamber configured for determining the amount of fluid passing from the first chamber and the second chamber.

The first device may also include a variable area float controlled device arranged between the first chamber and the second chamber and configured for also passing fluid from the first chamber to the second chamber. The variable area float controlled device may include a flotation device coupled to a stem configured for floating at a level that depends on the amount of fluid in the first chamber, and the stem may be a tapered stem configured for allowing more fluid to pass from the first chamber to the second chamber when the flotation device is high, and less fluid to pass through when the flotation device is low.

The method may also include purging air through a valve arranged in the second chamber at start-up, as well as arranging an auto shut off between the first chamber and the second chamber configured to shut off the air if vacuum pressure reaches an above normal level.

The apparatus may take the form of a system featuring a first chamber configured for receiving and separating air from a fluid, such as syrup, as the fluid enters the system; a second chamber; a first device configured for passing the fluid from the first chamber to the second chamber; a second device configured for passing the air from the first chamber to the second chamber so as to reintroduce the air back into the fluid and form a new fluid mixture having more uniform air bubbles; and an outlet port for discharging the new fluid out of the system.

Advantages of the present include the following: By reintroducing the air into the line in small increments there is no contact with the outside atmosphere, which in turn helps keep the system a closed system lowering the risk of bacteria being introduced from outside the system. The system also works on the vacuum side of the beverage system, while other known systems work on the pressure side of the system. However the concept can be apply to pressure side of the system as well.

BRIEF DESCRIPTION OF THE DRAWING

The drawing includes the following Figures:

FIG. 13, including FIGS. 13a, 13b, 13c, includes diagrams of another beverage air management system according to some embodiments of the present invention, where FIG. 13a shows a diagram of the air and fluid flow in beverage air management system; FIG. 13b shows a perspective exploded view of the beverage air management system; and FIG. 13c shows a perspective view of the beverage air management system.

DETAILED DESCRIPTION OF THE INVENTION

FIGS. 1-7 show one embodiment of a beverage air management system according to the present invention.

Figure 1:
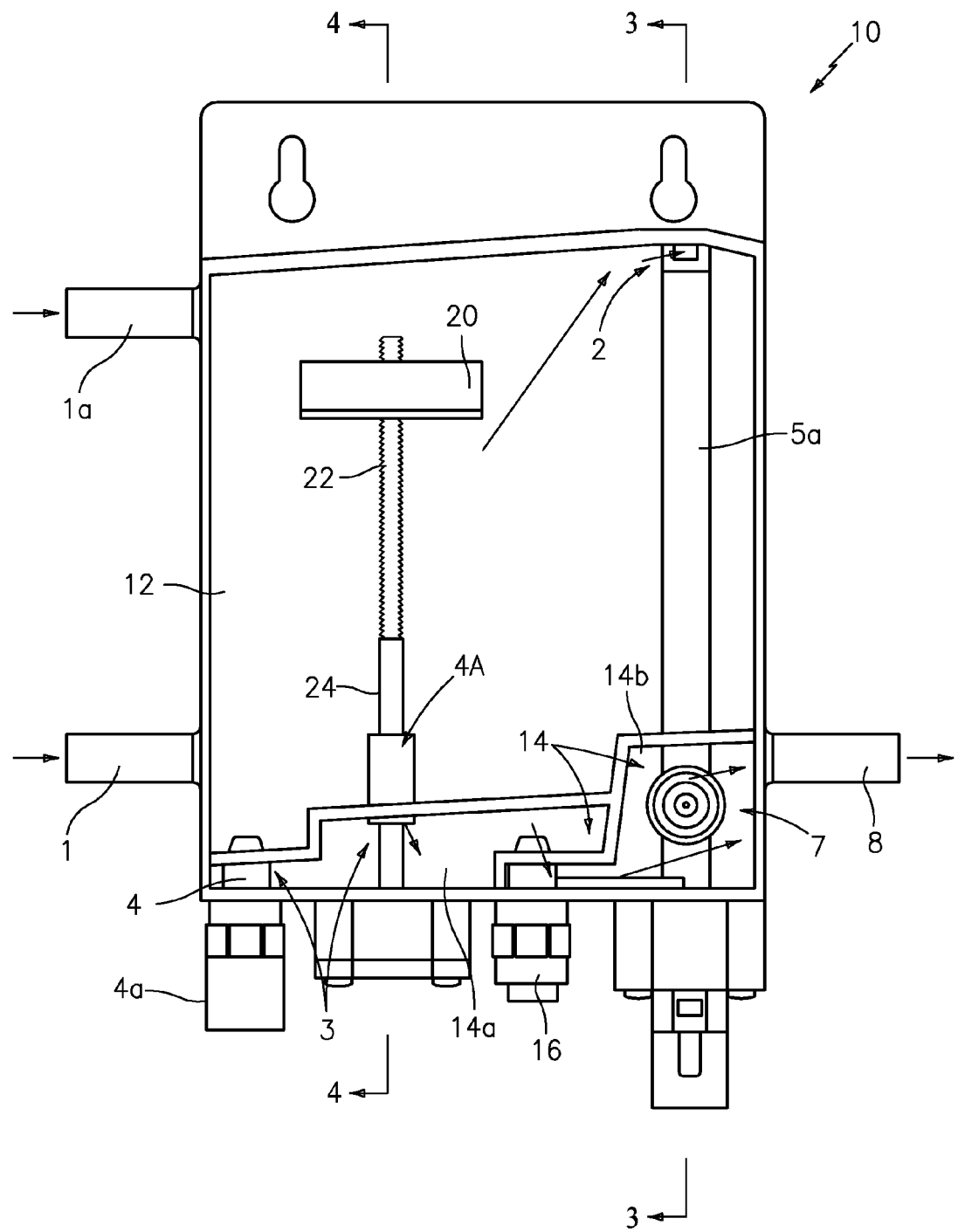
FIG. 1 is a diagram of a beverage or bag-in-box air management system according to some embodiments of the present invention.

In FIG. 1, a fluid having air 2 and syrup 3 therein enters an Beverage Air Management System BAMS henceforth generally indicated as 10 via a combined Inlet port 1 of a chamber 12, the air 2 in the syrup 3 then is separated, going to the top of chamber 12 of the BAMS 10, and the syrup 3 flows to the bottom of the chamber 12 of the BAMS 10.

The syrup 3 flows from the bottom of the chamber 12 through one or more first devices 4, 4A that may include an air/syrup vacuum ratio adjustment screw or valve opening assembly 4, a variable area float controlled valve and associated assembly 4A, or a combination thereof into a first part 14a of a second chamber generally indicated as 14 of the BAMS 10. The syrup 3 passes from the first part 14a of the second chamber 14 to a second part 14b of the second chamber 14 via an adjustable valve and associated assembly 16.

The air 2 in the first chamber 12 passes through one or more second devices 5, 5a, 6 that may include an air channel 5a, an auto shut-off and associated assembly 5 and a check valve and associated assembly 6, so that the air 2 passes through the air channel 5a, and the auto shut-off 5, then through the check valve 6 into a second part 14b of the second chamber 14, so as to reintroduce the air 2 back into the syrup 3 in minute bubbles and form a new fluid mixture 7 having more uniform air bubbles.

The new fluid mixture 7 then exits the BAMS 10 via a discharge port 8 and is provided to, e.g., a machine for machine a beverage, such as soda. By reintroducing the air 2 into the syrup 3 at minute intervals with the BAMS, the mixture for the soda made from the new fluid mixture 7 is not disturbed and is maintained at a specified level. As shown, the BAMS 10 also has an optional air and fluid inlet 1a.

Figure 2:
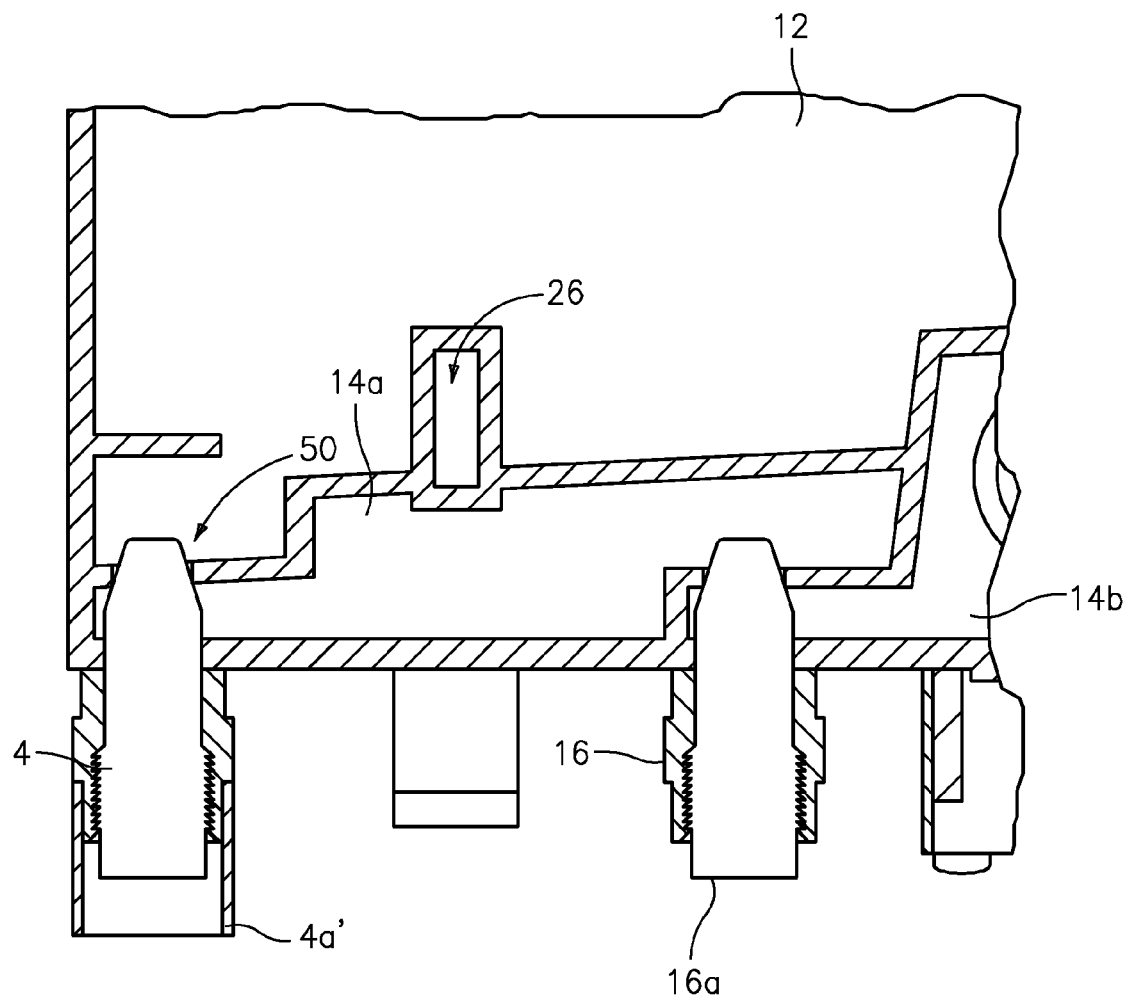
FIG. 2 is a cross-sectional diagram of adjustment screws or valves of the beverage air management system shown in FIG. 1.

FIG. 2 shows the adjustment screws or valves 4, 16 of the BAMS shown in FIG. 1 in further detail. The adjustment valve 4 on the left side as shown is opened or closed to control the amount of syrup that flows from the first chamber 12 to the first part 14 a of the second chamber 14, and can be set for optimum air-to-syrup ratio specific to each system. For example, if the adjustment screw 4 is closed all the vacuum drawn by the pump not shown goes to the air orifice 5a. See FIG. 1. In contrast, if adjustment screw 4 is fully open, all vacuum goes to the syrup opening SO for allowing passage of the syrup 3 from the first chamber 12 to the second chamber 14, as shown. The adjustment can be set for optimum air to syrup ratio specific to each system. The adjustable valve 16 on the right side as shown is typically open for allowing the syrup to pass from the first part 14a of the second chamber 14 to the second part 14b of the second chamber 14. At the start up of an installation of the BAMS 10, the valve 16 is typically closed to purge all air. For operation, when the adjustable valve 16 is closed all the vacuum goes to the air orifice for air purging. In FIG. 2, each adjustable valve 4, 16 has respective caps 4a ', 16a thereon to prevent/hinder tampering.

Figure 3:
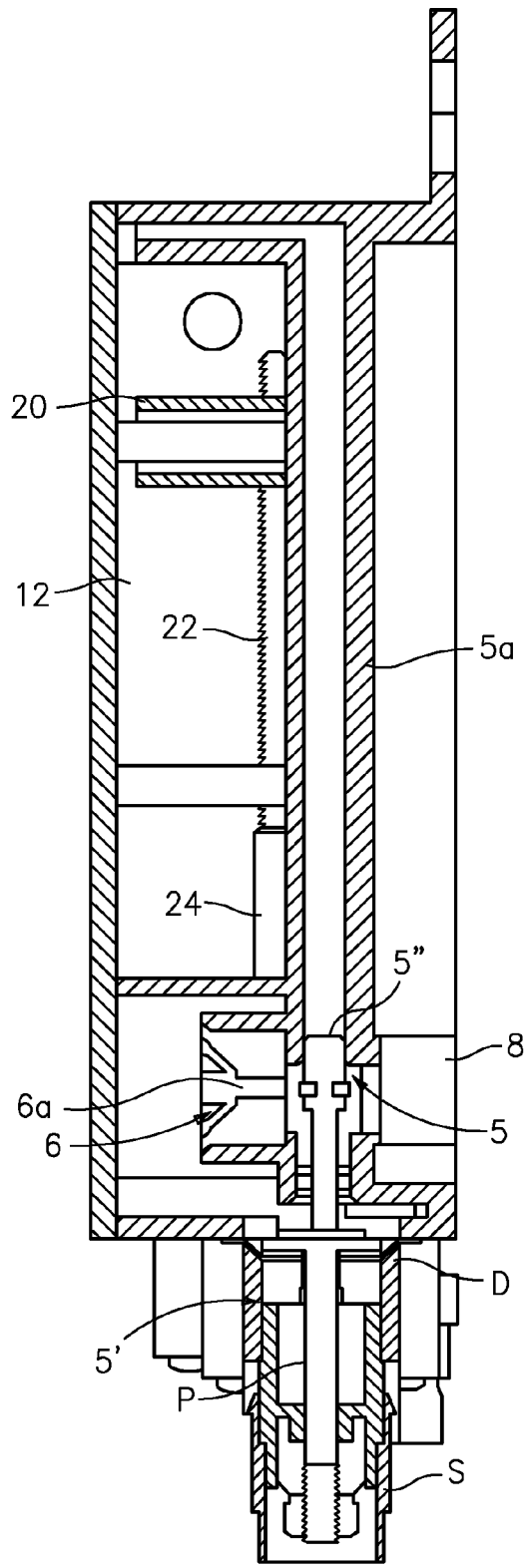
FIG. 3 is a cross-sectional diagram of a chimney portion of the beverage air management system shown in FIG. 1 along lines 3-3.

In FIG. 3, the check valve 6 is used to prevent syrup 3 from backing up into the air channel 5a. The check valve 6 may be optional depending upon requirements. The check valve 6 also touches the syrup 3 so that it is less likely to stick close due to dry syrup. As shown, the auto shut-off 5 has a shut-off assembly generally indicated as 5' and a shut-off member 5", such that the shut-off assembly 5' can be adjusted to move the shut-off member 5" up/down so as to engage a stem portion 6a of the check valve 6 to open and close the check valve 6. The check valve 6 is shown in an open position which allows air to pass into the second part 14b of the second chamber 14. Under normal operation, a diaphragm D senses vacuum from a pump not shown coupled to the outlet 8 that draws fluid from the BAMS 10. The vacuum rises and draws a piston P up compressing a spring S. When the pump shuts off, the vacuum reduces allowing the spring S to push the piston P back to its original position. In the auto shut off option, the air 2 is shut off if the vacuum reaches an above normal running vacuum. This will prevent excessive air from entering the discharge outlet 8 during an empty bag in box condition. As shown, the shut-off assembly 5' has O-ring seals unlabeled for presenting the new fluid mixture 7 from leaking from the second chamber 14.

Figure 4:
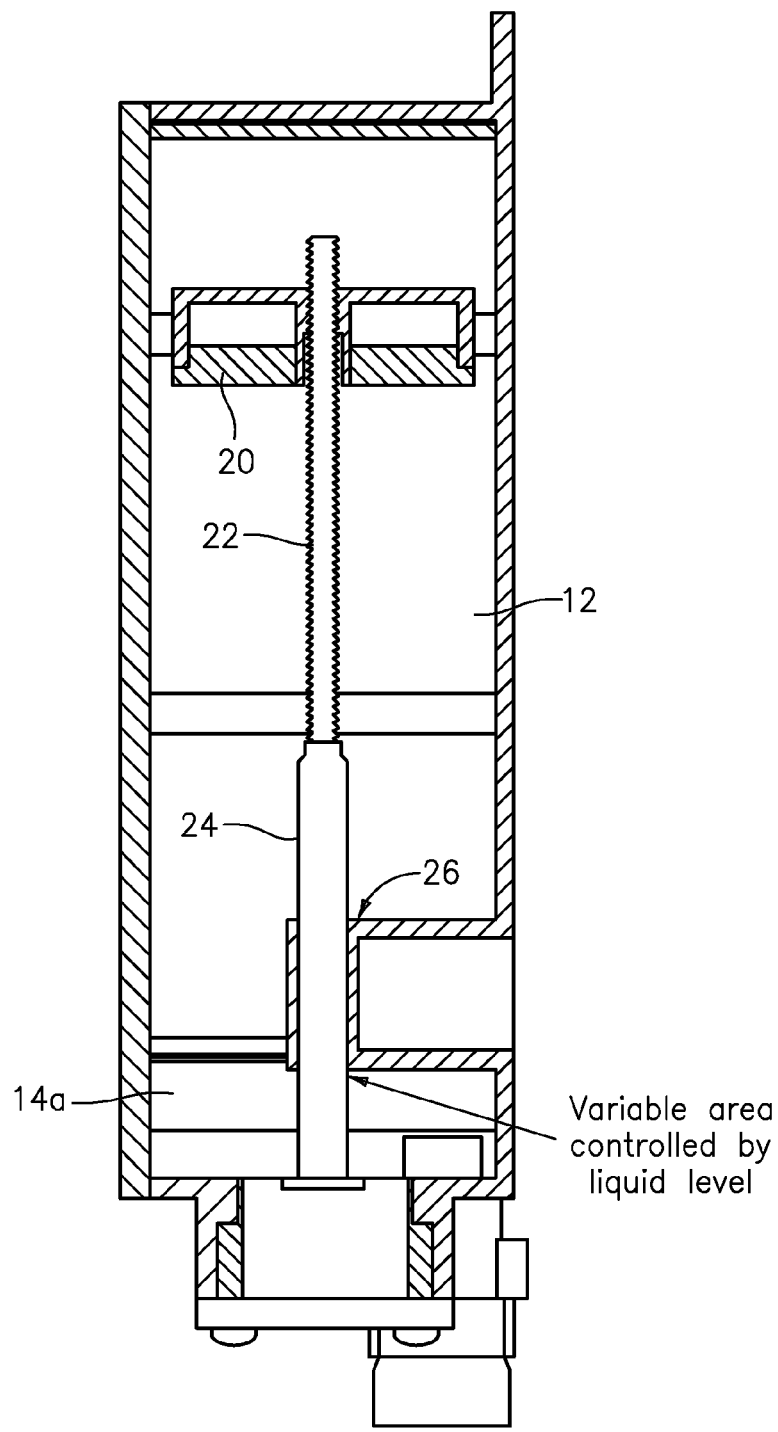
FIG. 4 is a cross-sectional diagram of a float device arranged in the beverage air management system shown in FIG. 1 along lines 3-3.
Figure 5:
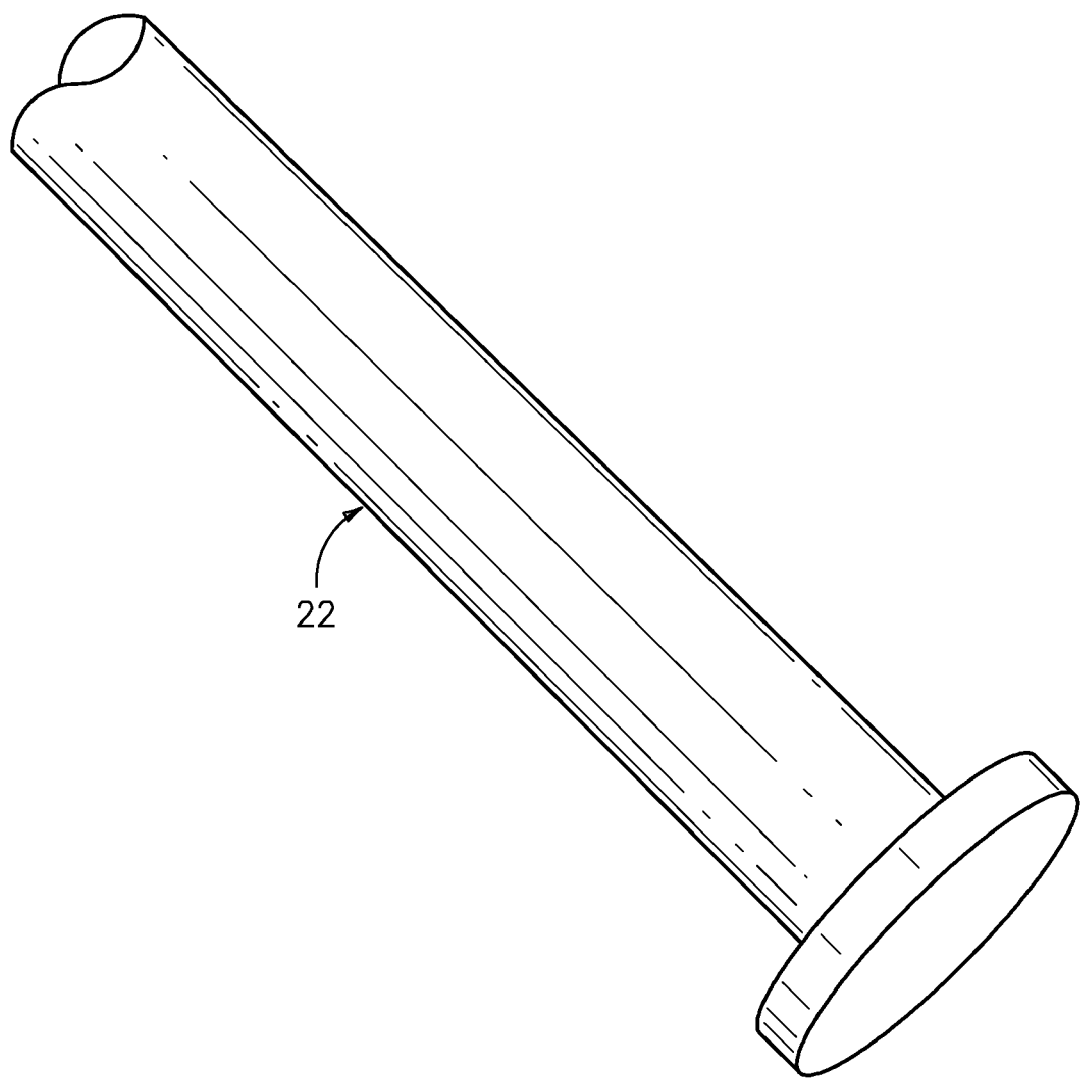
FIG. 5 is a diagram of a tapered stem that forms part of the floating device shown in FIGS. 1 and 4.
Figure 6:
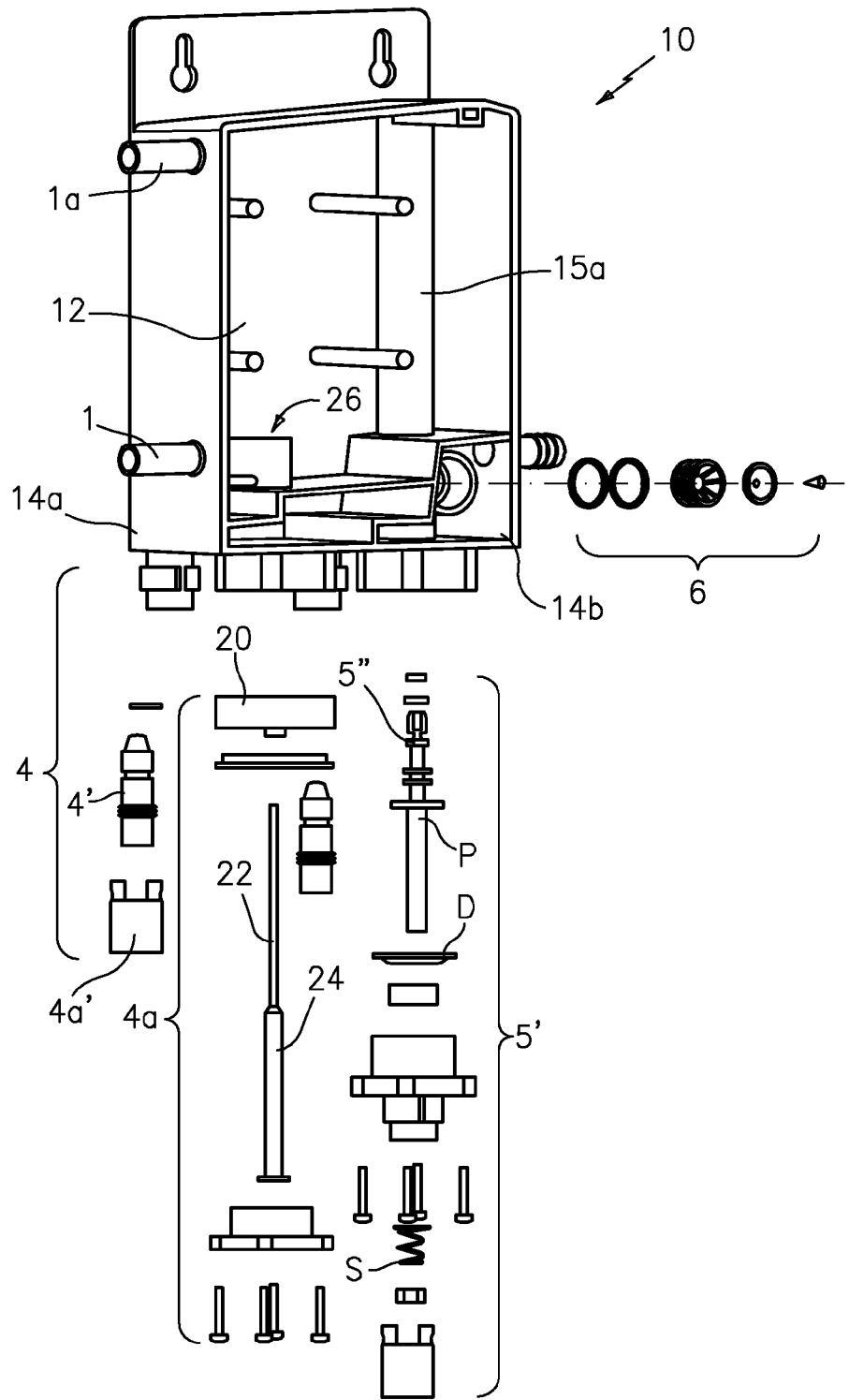
FIG. 6 is an exploded view of the beverage air management system shown in FIG. 1.
Figure 7:
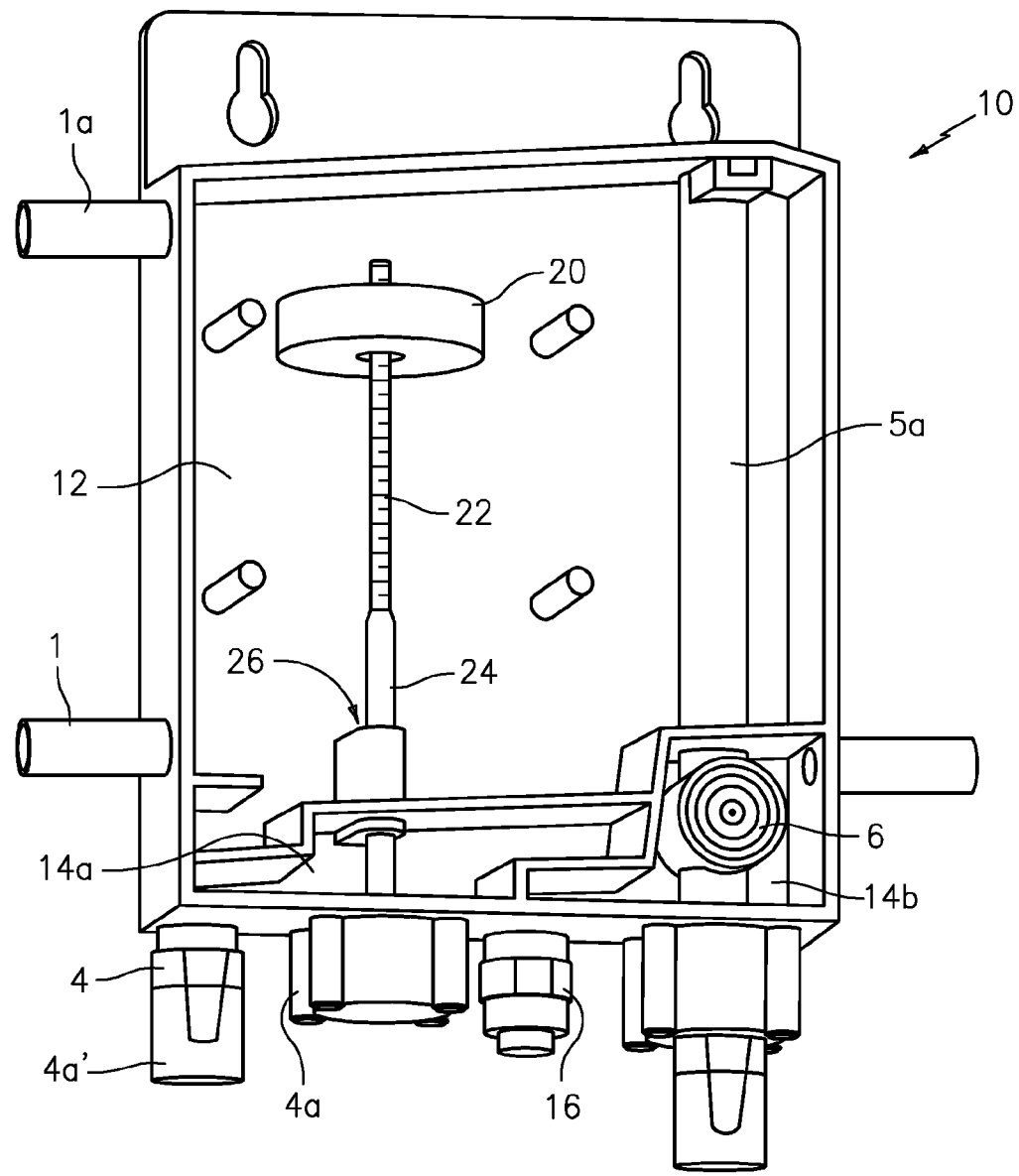
FIG. 7 is a 3-D view of the beverage air management system shown in FIG. 1.

In FIG. 4, the variable area float controlled device 4A may include a flotation device 20 coupled to a stem 22 for floating at a level that depends on the amount of fluid in the first chamber 12 . The stem 22 may be a tapered stem for allowing more fluid to pass through a syrup opening 26 (see FIG. 3) formed in the body of the BAMS 10 so as to allow the syrup to pass from the first chamber 12 to the first part 14a of the second chamber 14 when the flotation device 20 is high, and less fluid to pass through when the flotation device 20 is low. The variable area float controlled valve 4A or float device variably controls the size or width of the syrup opening 26 via the taper stem 24 which in turn controls the speed of the air inlet so it is likely to be less sensitive to the fluid level in the first chamber 12. See also FIG. 5.

FIGS. 8-12: Alternative Embodiment

Figure 8:
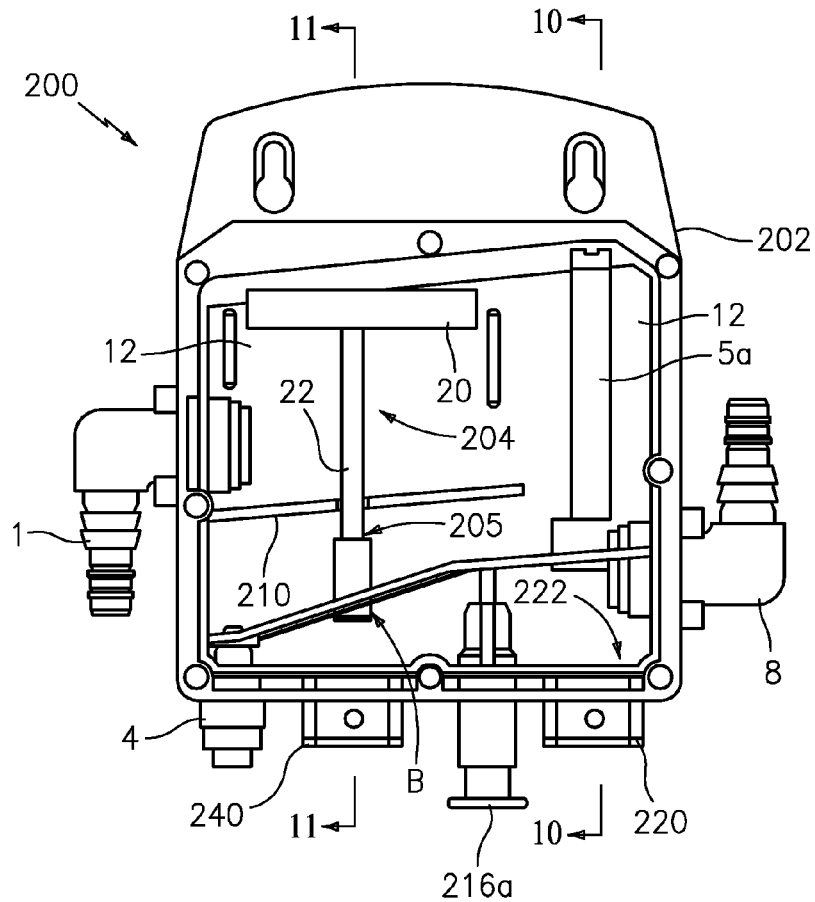
FIG. 8 is a diagram of a beverage air management system according to some embodiments of the present invention.

FIGS. 8-12 show another embodiment of a beverage air management system generally indicated as 200 according to the present invention, having a body 202, a cover 203 and a cover seal 203a. Similar elements in FIGS. 8-12 are labeled with similar reference numerals as the embodiment shown in FIG. 1-7. The difference between the embodiment shown in FIGS. 1-7 and the embodiment shown in FIGS. 8-12 are generally described as follows:

In FIG. 8, the BAMS 200 may include a float control valve generally indicated as 204 having possible options depending on the fluid being processed by the BAMS. For example, the float control valve assembly 204 may be similar to the float control valve 4a in relation to the embodiment in FIGS. 1-7. Alternatively, the lower part of the float control valve assembly 204 may be replaced with a plug 240. Further still, the float control valve assembly 204 may include a C-clip (see element 204b in FIG. 11) at the base B as indicated to prevent complete closure of a syrup aperture generally indicated as 205 formed in the body between the first chamber 12 and the second chamber 14 in which the tapered stem 22 is arranged therein, as shown.

In FIG. 8, the BAMS 200 may include a wall 210 to adjust the flow path of the fluid/air. The wall 210 is shown slightly oblique to the lower wall of the body 202. the scope of the invention is not intended to be limited to the angle of the wall 210. See also the embodiment in FIG. 18.

Figure 10:
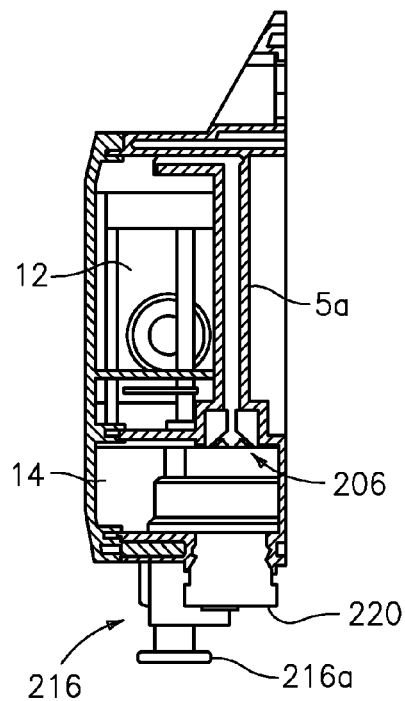
FIG. 10 is a cross-sectional diagram of a chimney portion of the beverage air management system shown in FIG. 8 along lines 10-10.

In FIG. 8, the BAMS 200 may include a check valve and associated assembly generally indicated as 206 that faces downwardly as shown best in FIG. 10.

In FIG. 8, the BAMS 200 may have the auto shut-off assembly removed (see and compare element 5 in FIG. 3) and replaced with a plug 220 inserted in an auto shut-off assembly aperture generally indicated as 222 (see also FIG. 12) in the body 202. The aperture 222 may be used during assembly of the BAMS 200 to insert the check valve and associated assembly 206.

Figure 9:
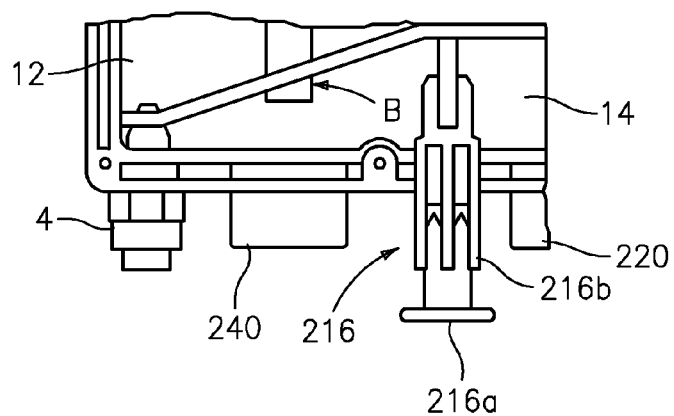
FIG. 9 is a cross-sectional diagram of adjustment screws or valves of the beverage air management system shown in FIG. 8.

In FIG. 8, the BAMS 200 may have the screw valve assembly removed (see and compare element 16 in FIG. 2). As shown in FIG. 9, the screw valve may be replaced by a push valve assembly 216 having a push valve 216a and a spring 216b, where the push valve assembly 216 is closed for start-up, then released during normal operation. The internal spring 216b keeps the push valve 216a in a normally open position.

Figure 11:
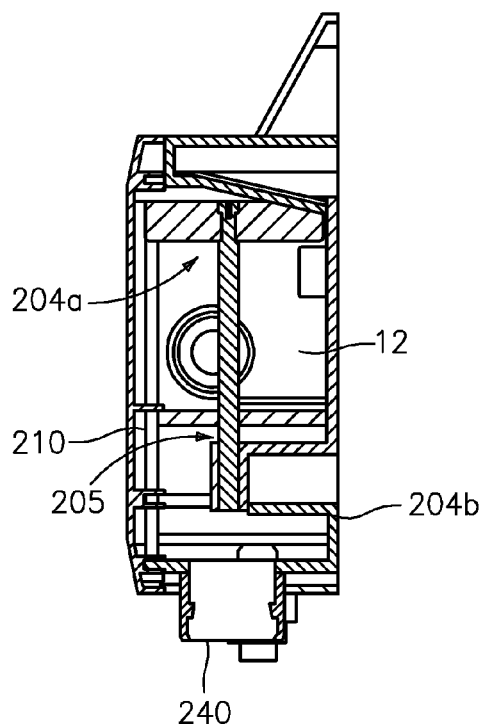
FIG. 11 is a cross-sectional diagram of a float device arranged in the beverage air management system shown in FIG. 8 along lines 11-11.
Figure 12:
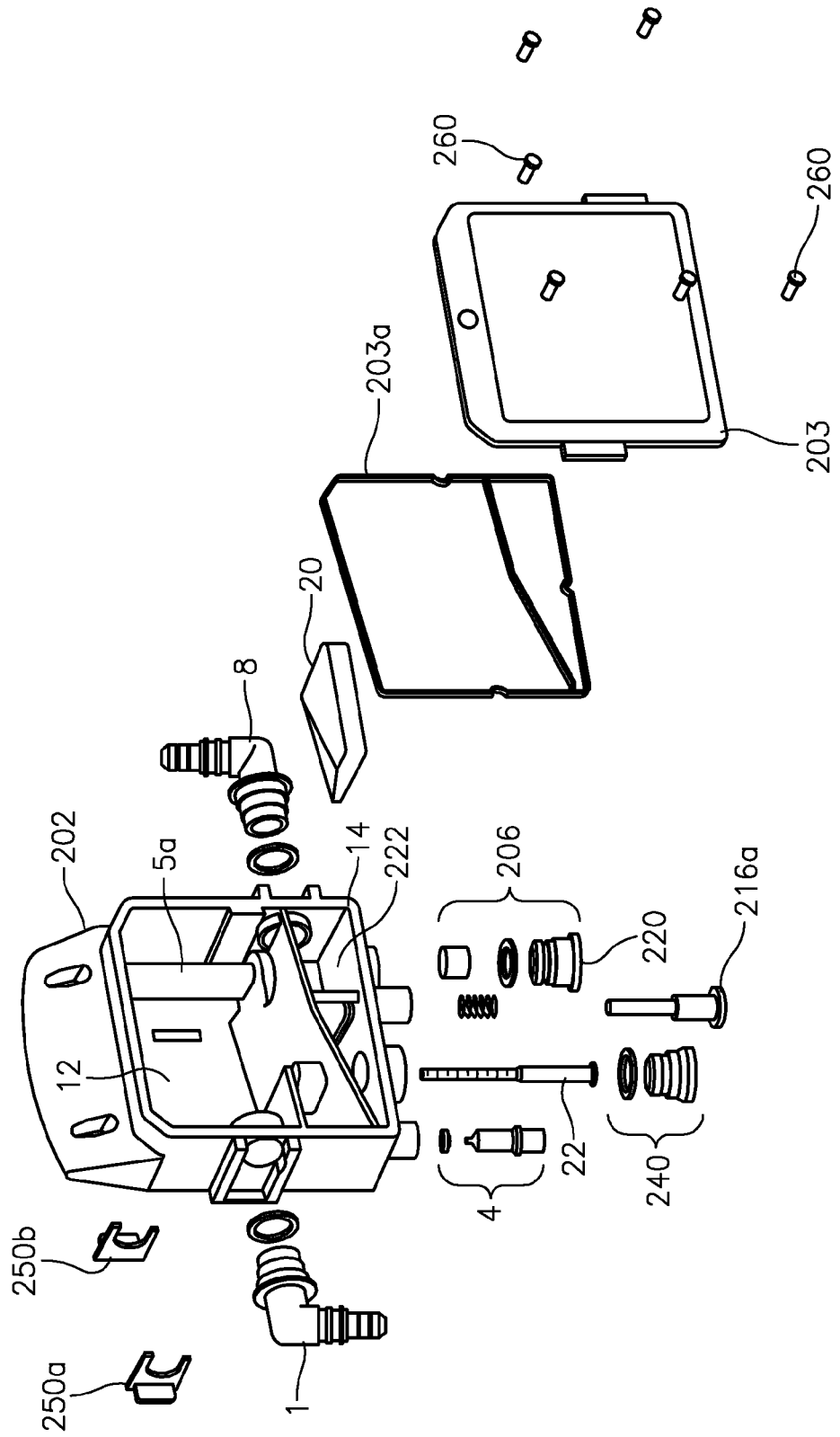
FIG. 12 is an exploded view of the beverage air management system shown in FIG. 8.
Figure 14:
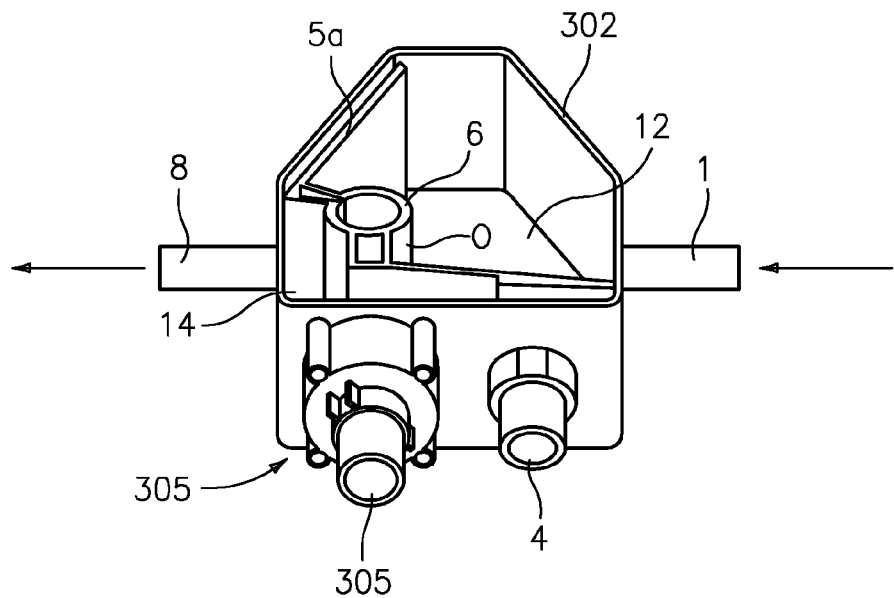
FIG. 14 shows a perspective bottom view of the beverage air management system shown in FIG. 13c.
Figure 15:
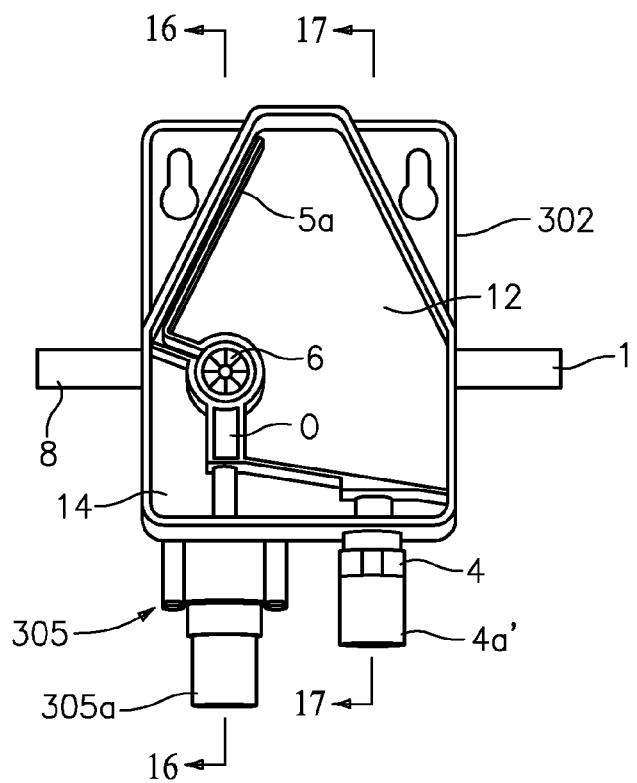
FIG. 15 is a top down view of the beverage air management system shown in FIG. 13c.

In FIG. 11, the float valve assembly 204 may take the form of a rubber plug generally indicated as 204a to block the flow path permanently. As shown, the C-clip 204b is added so that even when the float is fully raised the flow path of the syrup is not closed. The float valve assembly also has a plug assembly 240, as shown.

As shown, the clips 250a and 250b function to retain the inlet and outlet to the body 202. By way of example, screws 260 are shown as holding the cover 203 to the body 202, although the scope of the invention is not intended to be limited to any particular type or kind of fastening device for holding these elements together.

FIGS. 13-17: Alternative Embodiment

FIGS. 13-17 show another embodiment of a beverage air management system generally indicated as 300 according to the present invention. Similar elements in FIGS. 13-17 are labeled with similar reference numerals as the embodiment shown in FIG. 1-7.

As shown in FIGS. 13-17, the BAMS 300 has a body portion 302 and a cover portion 304 for enclosing the body portion 302. The other part of the BAMS 300 are labeled similar to and consistent with that shown in FIG. 13a.

In FIG. 13a, the combined air and syrup enter the first chamber 12 of the Beverage Air Management System BAMS henceforth via the Inlet port 1, the air flow 2 in the syrup then is separated, going to the top of BAMS, the syrup flow 3 then flows to the bottom through the adjustment valve opening 4 into the second chamber 14. The air 2 passes down through the air channel 5a through the check valve 6 then through an orifice O, where the air 2 is reintroduced to the syrup 3 in minute bubbles so as to form the new fluid mixture 7, which then exits the BAMS 10 via the discharge port 8. Consistent with that discussed above, by reintroducing the air 2 back into the syrup 3 at minute intervals the mixture for the soda is not disturbed and is maintained at the specified level.

Figure 16:
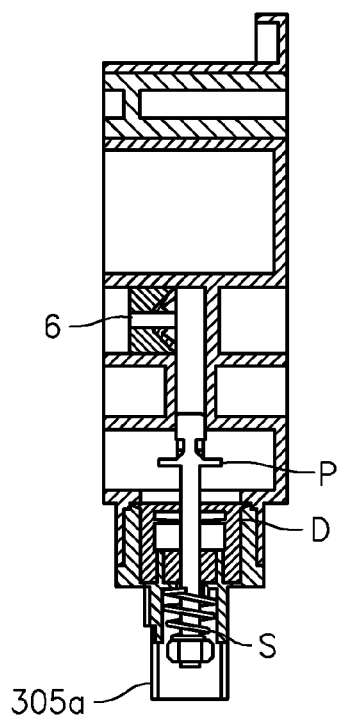
FIG. 16 is a cross-section view of the check valve assembly of the beverage air management system shown in FIG. 15 along lines 16-16.

FIGS. 13b and 16 show the auto shut-off assembly 305 in greater detail, which operates in a manner similar to the auto shut-off assembly generally indicated as 5' in the embodiment described above in relation to FIGS. 1-7. For example, under normal operation, the diaphragm D senses vacuum from the pump not shown, the vacuum rises and draws the piston P up compressing the spring S. When the pump shuts off, the vacuum reduces allowing the spring S to push the piston P back to its original position. In the Auto Shut off option, the air is shut off if the vacuum reaches an above normal running vacuum. This will prevent air from entering the discharge during an empty bag in box condition.

Figure 17:
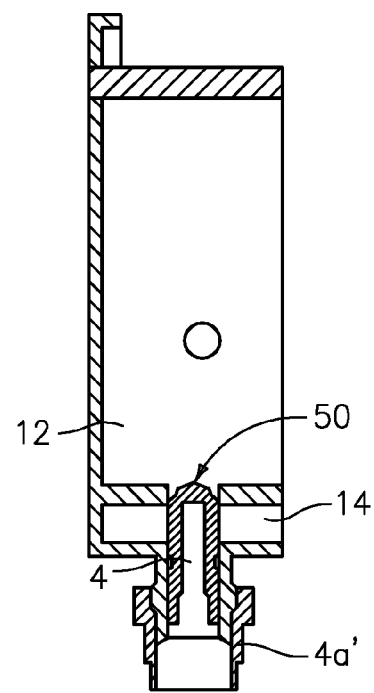
FIG. 17 is a cross-section view of the air/fluid vacuum ratio adjustment screw of the beverage air management system shown in FIG. 15 along lines 17-17.

In FIG. 17, if the adjustment screw 4 is closed all the vacuum goes to the air orifice 5a. See FIG. 13a. If adjustment screw is fully open, all vacuum goes to the syrup opening SO, as shown. The adjustment can be set for optimum air to syrup ratio specific to each system.

The auto shut-off assembly 305 also has a cap 305a to prevent/hinder tampering similar to the cap 4a' of the auto shut-off assembly.

Figure 18:
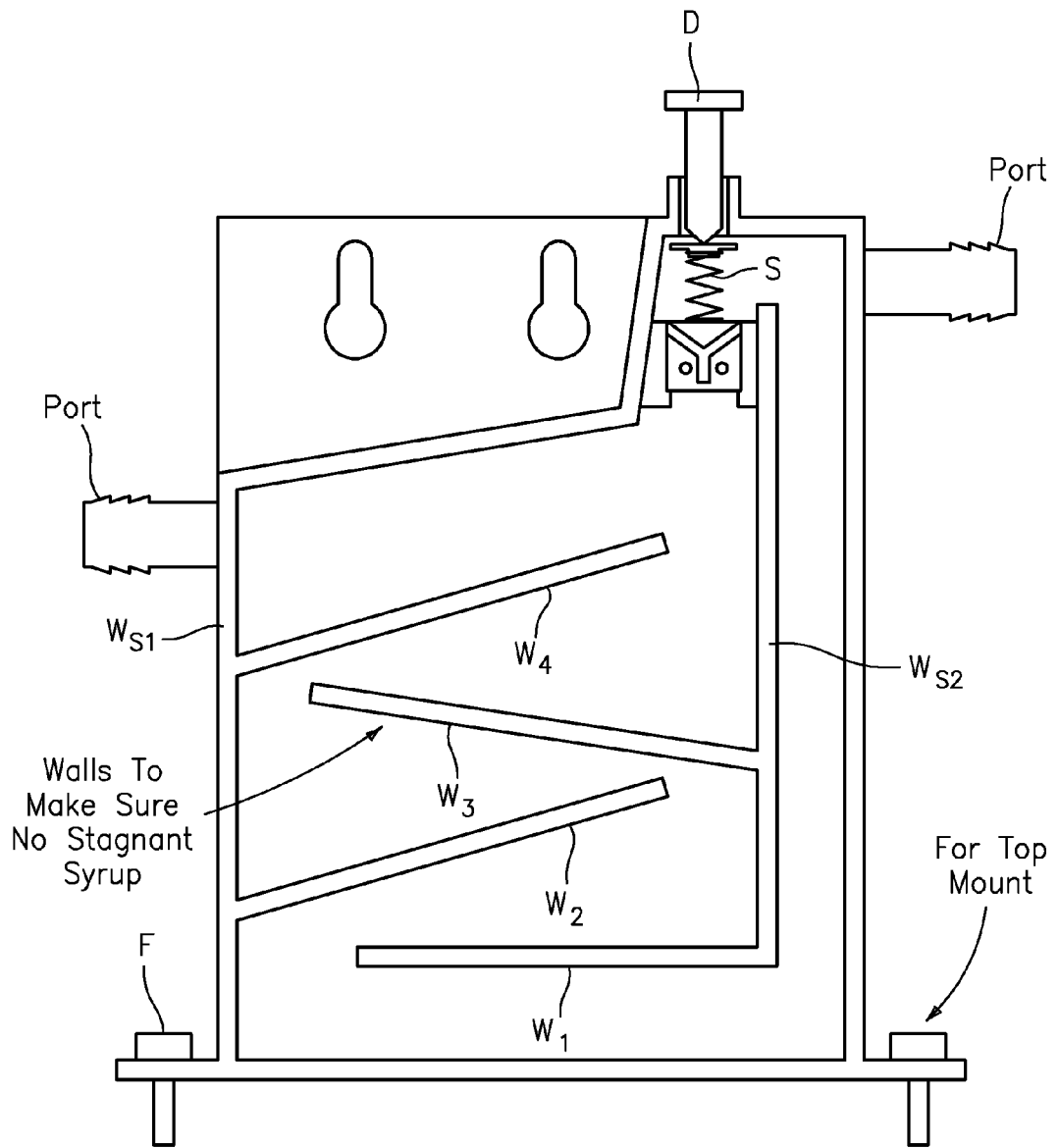
FIG. 18 is a diagram of an alternative embodiment of a beverage air management system according to some embodiments of the present invention.

FIG. 18: Alternative Embodiment

FIG. 18 shows an alternative embodiment of a beverage air management system featuring a check valve having an adjustable cracking pressure. The cracking pressure of the check valve is adjusted by turning a screw-like device D that compresses or decompresses a spring S arranged between the screw-like device D and the check valve. In operation, fluid e.g. syrup causes pressure on the check valve, which opens or closes depending on the adjustment to allow air to flow into the internal chamber of the beverage air management system. The adjustment of the compression of the spring S determines the amount of fluid pressure needed to open or close the check valve so as to control the amount of air entering the internal chamber.

The check valve having the adjustable cracking pressure is shown as an N5000 check valve, which is known in the art. However, the scope of the invention is not intended to be limited to any particular type or kind of check valve.

As shown, the beverage air management system in FIG. 18 may be top mounted using the fastening devices F. Embodiments are also envisioned in which the beverage air management system in FIG. 18 may be flipped or rotated by 90°. The scope of the invention is not intended to be limited to the orientation of the overall system.

The beverage air management system in FIG. 18 also features an alternative internal wall design having walls w1, w2, w3, w4. In operation, these walls w1, w2, w3, w4 cooperate to make sure that substantially no stagnant syrup remains in the internal chamber. The physical relationship of the internal walls w1, w2, w3, w4 to the side walls Ws1, Ws2 is shown by way of example; and the scope of the invention is not intended to be limited to any particular number of internal walls, or any particular angular relationship between any particular internal wall and any particular side wall, or any particular angular relationship between the internal walls themselves, etc., in the overall system.

Possible Applications

Possible applications include at least the following:
Beverage post mix and premix application, Industrial, Areas where excessive air in fluids is disruptive.

The Scope of the Invention

It is important to note that many times during the description an element is initially referred to and labeled as an element and associated assembly, and then later in the description the principle element is referred to by the same reference number. This technique is done so that the instant patent application reads consistent with the descriptions in the earlier filed provisional applications as well as to improve overall readability. For example, a person skilled in the art would appreciate, especially when examining the detailed Figures provided herein, that an element and associated assembly may include besides the element itself, some other sub-parts like O-rings, clips, screws, etc., which need not be exhaustively described and labeled so as to clutter the overall description of the fundamental invention.

Further, the embodiments shown and described in detail herein include many different type and kinds of check valves, adjustable valves or screws, channels, openings or apertures, walls, springs, pistons, diaphragms, floats, tapered stems, caps, etc., which are all known in the art, and the scope of the invention is not intended to be limited to any particular type and kinds thereof.

Further still, the embodiments shown and described in detail herein are provided by way of example only; and the scope of the invention is not intended to be limited to the particular configurations, dimensionalities, and/or design details of these parts or elements included herein, including the check valves, adjustable valves or screws, channels, openings or apertures, walls, springs, pistons, diaphragms, floats, tapered stems, caps, etc. In other words, a person skilled in the art would appreciate that design changes to these embodiments may be made and such that the resulting embodiments would be different than the embodiments disclosed herein, but would still be within the overall spirit of the present invention.

It should be understood that, unless stated otherwise herein, any of the features, characteristics, alternatives or modifications described regarding a particular embodiment herein may also be applied, used, or incorporated with any other embodiment described herein. Also, the drawings herein are not drawn to scale.

Although the invention has been described and illustrated with respect to exemplary embodiments thereof, the foregoing and various other additions and omissions may be made therein and thereto without departing from the spirit and scope of the present invention.

What we claim is:

1. A beverage air management system for coupling a bag of syrup to a dispensing system for providing the syrup into a drink, comprising:
    a first chamber configured for receiving an air and syrup combination having a mixture of large air bubbles at times and substantially little or no air bubble at other times, and for separating air going to the top of the first chamber from syrup flowing to the bottom of the first chamber;
    a second chamber configured for receiving the syrup;
    a first device comprising an air/syrup vacuum ratio adjustment screw or valve opening assembly configured to be adjustably opened or closed to control the amount of the syrup that flows from the first chamber to part of the second chamber and to be set for an optimum air-to-syrup ratio specific to each beverage air management system;
    a second device configured for passing the air from the first chamber to another part of the second chamber so as to reintroduce the air back into the syrup at the optimum air-to-syrup ratio and form a new syrup mixture having more uniform air bubbles; and
    an outlet port configured for responding to a vacuum and discharging the new syrup mixture from the beverage air management system.

2. A beverage air management system according to claim 1, wherein the second device is configured as an air channel to provide air separated from the air and syrup combination from the first chamber to the second chamber.

3. A beverage air management system according to claim 1, wherein the first device also includes a variable area float controlled device arranged between the first chamber and the second chamber and configured for also passing fluid from the first chamber to the second chamber.

4. A beverage air management system according to claim 3, wherein the variable area float controlled device includes a flotation device coupled to a stem configured for floating at a level that depends at least partly on the amount of fluid in the first chamber.

5. A beverage air management system according to claim 4, wherein the stem is a tapered stem configured for allowing more fluid to pass from the first chamber to, the second chamber when the flotation device is high, and less fluid to pass through when the flotation device is low.

6. A beverage air management system according to claim 1, wherein the system includes an adjustable valve configured in the second chamber for purging air at start-up.

7. A beverage air management system according to claim 1, wherein the beverage air management system includes an auto shut off arranged between the first chamber and the second chamber and configured to shut off the air if vacuum pressure reaches an above normal level.

8. A beverage air management system according to claim 2, wherein the air channel is configured with a check valve arranged between the first chamber and the second chamber to prevent the syrup from backing up into the air channel.

* * * * *